US009457911B2

(12) United States Patent
Brown

(10) Patent No.: US 9,457,911 B2
(45) Date of Patent: Oct. 4, 2016

(54) EMERGENCY EVACUATION SYSTEMS DOOR RESTRAINT LANYARD FOR AIRCRAFT

(71) Applicant: Air Cruisers Company, Wall Township, NJ (US)

(72) Inventor: Frank John Brown, Bayville, NJ (US)

(73) Assignee: Air Cruisers Company, Wall Township, NJ (US)

(*) Notice: Subject to any disclaimer, the term of this patent is extended or adjusted under 35 U.S.C. 154(b) by 0 days.

(21) Appl. No.: 14/176,566

(22) Filed: Feb. 10, 2014

(65) Prior Publication Data

US 2014/0224937 A1     Aug. 14, 2014

Related U.S. Application Data

(60) Provisional application No. 61/763,056, filed on Feb. 11, 2013.

(51) Int. Cl.
B64D 25/14     (2006.01)

(52) U.S. Cl.
CPC ..................... B64D 25/14 (2013.01)

(58) Field of Classification Search
CPC ........................................... B64D 25/14
USPC ...................................... 244/137.2
See application file for complete search history.

(56) References Cited

U.S. PATENT DOCUMENTS

| | | | | |
|---|---|---|---|---|
| 3,944,023 A * | 3/1976 | Fisher | ............................. | 182/48 |
| 4,567,977 A * | 2/1986 | Fisher | ........................ | 193/25 B |
| 5,586,615 A * | 12/1996 | Hammer et al. | ................ | 182/48 |
| 7,467,764 B2 | 12/2008 | Hintzman | | |
| 2004/0094671 A1* | 5/2004 | Moro et al. | ................ | 244/137.2 |
| 2013/0200217 A1* | 8/2013 | Biro | .......................... | 244/137.2 |

* cited by examiner

Primary Examiner — Christopher P Ellis
Assistant Examiner — Jessica Wong
(74) Attorney, Agent, or Firm — Kilpatrick Townsend & Stockton LLP; Dean W. Russell; Tiffany L. Williams

(57) ABSTRACT

Evacuation slide systems including a slide pack comprising a packboard coupled to an aircraft door, a girt bar coupled to an aircraft floor when the aircraft door is armed, and a restraint coupled to the packboard and the girt bar are detailed. The restraint controls a speed at which the aircraft door opens when the aircraft door is armed until the aircraft door has traveled beyond a predetermined distance.

15 Claims, 6 Drawing Sheets

EMERGENCY EVACUATION SYSTEMS DOOR RESTRAINT LANYARD FOR AIRCRAFT

CROSS-REFERENCE TO RELATED APPLICATION

This application claims the benefit of U.S. Provisional Patent Application Ser. No. 61/763,056, filed Feb. 11, 2013, and entitled "Aircraft Emergency Evacuation Systems Door Restraint Lanyard," the entire contents of which application are incorporated herein by this reference.

FIELD OF THE INVENTION

This application relates to systems for evacuating passenger vessels such as aircraft and more particularly, but not exclusively, to door restraint lanyards for door-mounted inflatable evacuation slides.

BACKGROUND OF THE INVENTION

U.S. Pat. No. 7,467,764 to Hintzman discusses certain conventional emergency evacuation slide assemblies. As noted in the Hintzman patent:

> Door-mounted emergency evacuation slides are typically contained within an enclosure mounted to the interior surface of the aircraft exit door. Opening of the door in the "armed" position causes the slide to be pulled downward out of the enclosure into a position immediately outboard of and below the door exit opening. The evacuation slide is then rapidly inflated to form a structure sufficiently rigid to enable the airline passengers to escape.

See Hintzman, col. 1, ll. 14-21. The contents of the Hintzman patent are incorporated herein in their entirety by this reference.

While opening of the door in the armed position is the conventional method of activating evacuation systems, in certain cases, the door may open too rapidly. As a result, a reliable method of slowing the speed at which the door opens is needed so that the release cable may be pulled to release the pack, which also does not interfere with the slide deployment.

SUMMARY OF THE INVENTION

The present invention provides an inflatable evacuation slide system comprising a slide pack comprising a packboard coupled to an aircraft door, a girt bar coupled to an aircraft floor when the aircraft door is armed, and a restraint coupled to the packboard and the girt bar.

In some embodiments, the restraint controls a speed at which the aircraft door opens when the aircraft door is armed until the aircraft door has traveled beyond a predetermined distance. In other embodiments, the restraint dissipates energy generated by an outward movement of the aircraft door when the aircraft door is armed until the outward movement of the aircraft door exceeds a predetermined distance.

The restraint may be formed of webbing sewn with loops and no back stitch, wherein the restraint controls the speed at which the aircraft door opens by breaking the loops in the webbing. The restraint may also be formed of high strength hook-and-loop materials.

In yet other embodiments, the restraint comprises an energy absorbing portion that slows the outward movement of the aircraft door when the aircraft door is armed and/or breaks when the outward movement of the aircraft door exceeds a predetermined distance.

The system may further comprises a door bustle coupled to the packboard, wherein the aircraft door has traveled beyond the predetermined distance when an inside edge of the door bustle vertically clears a door sill of the aircraft. In other embodiments, the predetermined distance is approximately 7 inches.

Other objects, features, and advantages of the present invention will be apparent to those skilled in the appropriate field with reference to the remaining text and the drawings of this application.

DETAILED DESCRIPTION

Figure 1:
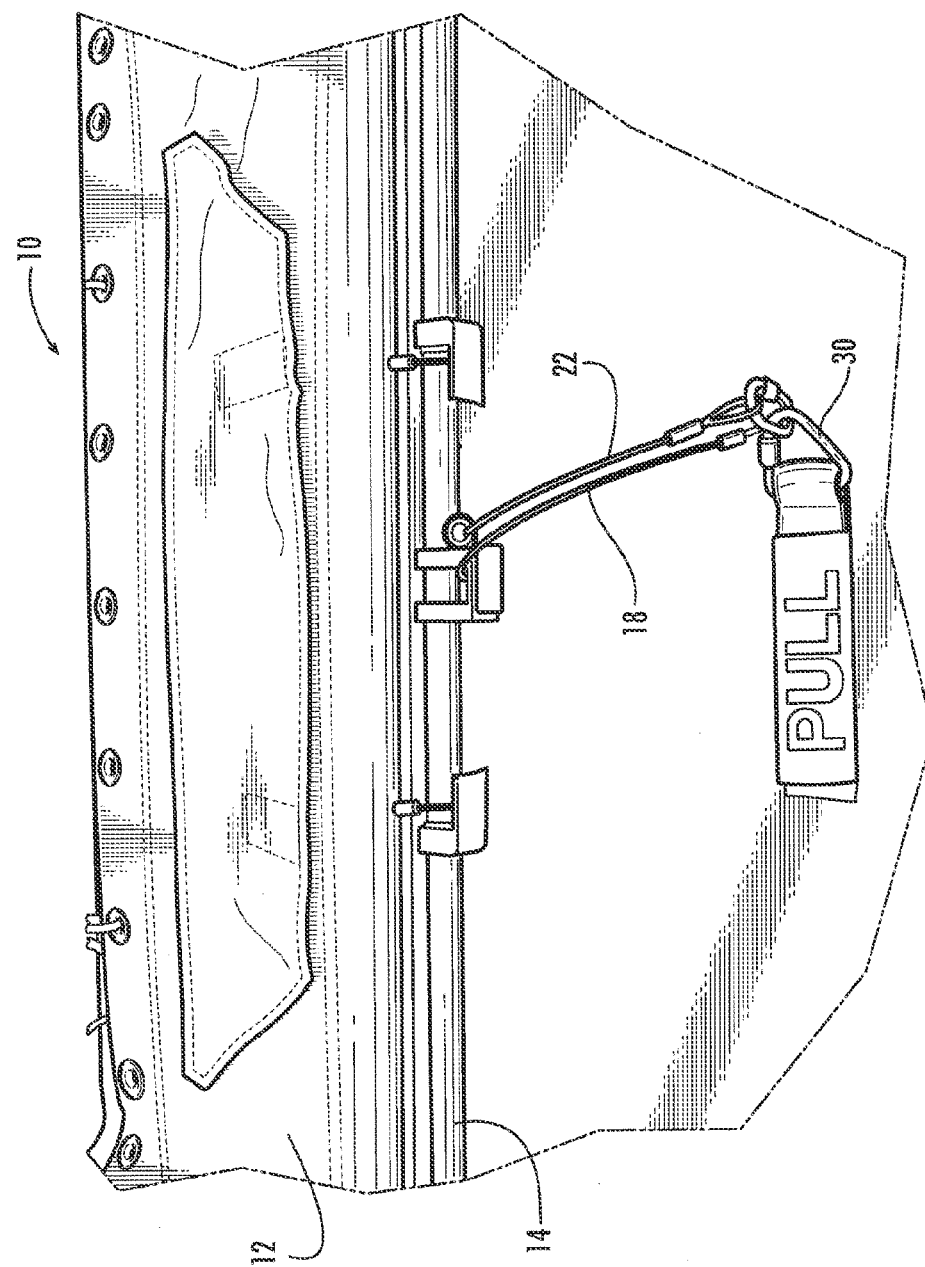
FIG. 1 schematically illustrates portions of a slide pack consistent with the present invention.
Figure 2:
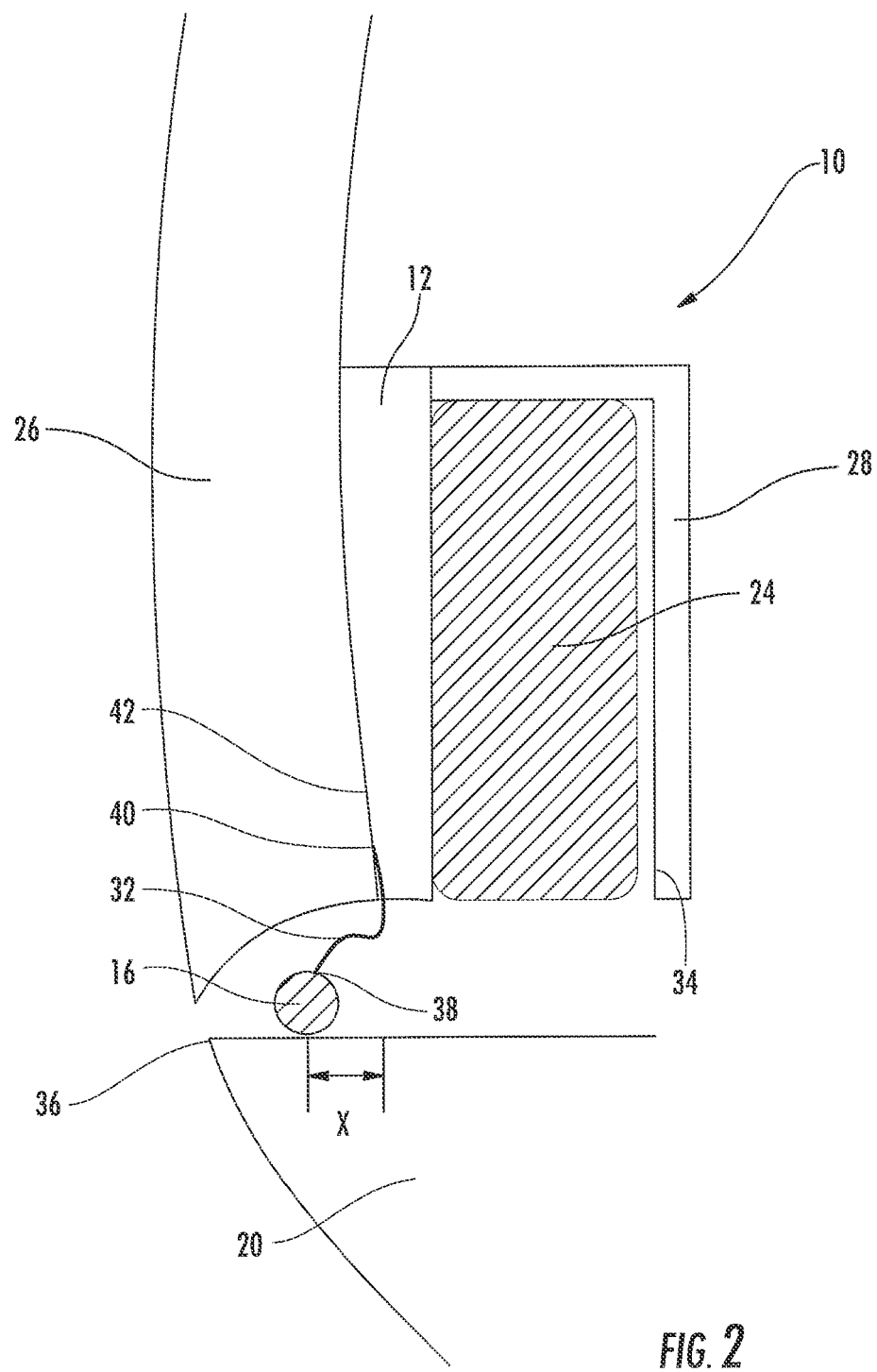
FIG. 2 schematically illustrates a side view of the slide pack of FIG. 1 with the aircraft door closed and armed.

Detailed in FIGS. 1-6 are portions of an exemplary inflatable evacuation slide pack 10. Pack 10 may include packboard 12 and release assembly 14 (or other structure) suitable for attachment to pack release cable 18 and inflation cable 22. Cables 18 and 22 are shown as being connected to ring 30; in turn, ring 30 preferably connects to a girt bar 16 of an aircraft or any other mechanism or object suitable for tensioning cables 18 and 22 when pack 10 is to be deployed (as, for example, when an "armed" aircraft door 26 opens). Pack 10 additionally may include an inflatable evacuation slide 24.

The packboard 12 may be mounted to an interior surface of the aircraft door 26. A door bustle 28 may be attached over the pack 10. When the aircraft door 26 is opened in the armed condition, the evacuation slide 24 drop away from the packboard 12. As the evacuation slide 24 drops away from the aircraft door 26, a fixed end of the evacuation slide 24 is secured to the aircraft floor 20 by the girt bar 16.

In certain cases, the speed at which the aircraft door 26 opens in the armed condition may need to be controlled (i.e., slowed down). To slow down the opening speed of the aircraft door 26, a restraint 32 may be used. The critical time period in which the speed of the aircraft door 26 opening needs to be controlled is typically between when the aircraft door 26 starts to open by rotating outward until an inside edge 34 of the door bustle 28 vertically clears a door sill 36 of the aircraft (as indicated by the dashed vertical line in FIG. 4).

As illustrated in FIGS. 2-5, a first end 38 of the restraint 32 may be attached to a fixed point on the girt bar 16 since the girt bar 16 is engaged and disengaged from the aircraft floor 20 as the aircraft door 26 is armed and disarmed. A second end 40 of the restraint 32 may be attached to an outboard surface 42 of the packboard 12. In other embodiments, the second end 40 may be attached to any suitable location on the packboard 12, including but not limited to an inboard surface, a lower surface, embedded within a recess within the packboard 12 or other locations.

In certain embodiments, the outboard surface 42 is inwardly spaced apart from the girt bar 16 by a distance X. In certain embodiments, the distance X is approximately 2.25 inches. However, a person of ordinary skill in the art will understand and appreciate that the distance between the girt bar 16 and the outboard surface 42 may be any suitable distance, and may include circumstances where the girt bar 16 is positioned inwardly relative to the outboard surface 42 of the packboard 12.

Figure 3:
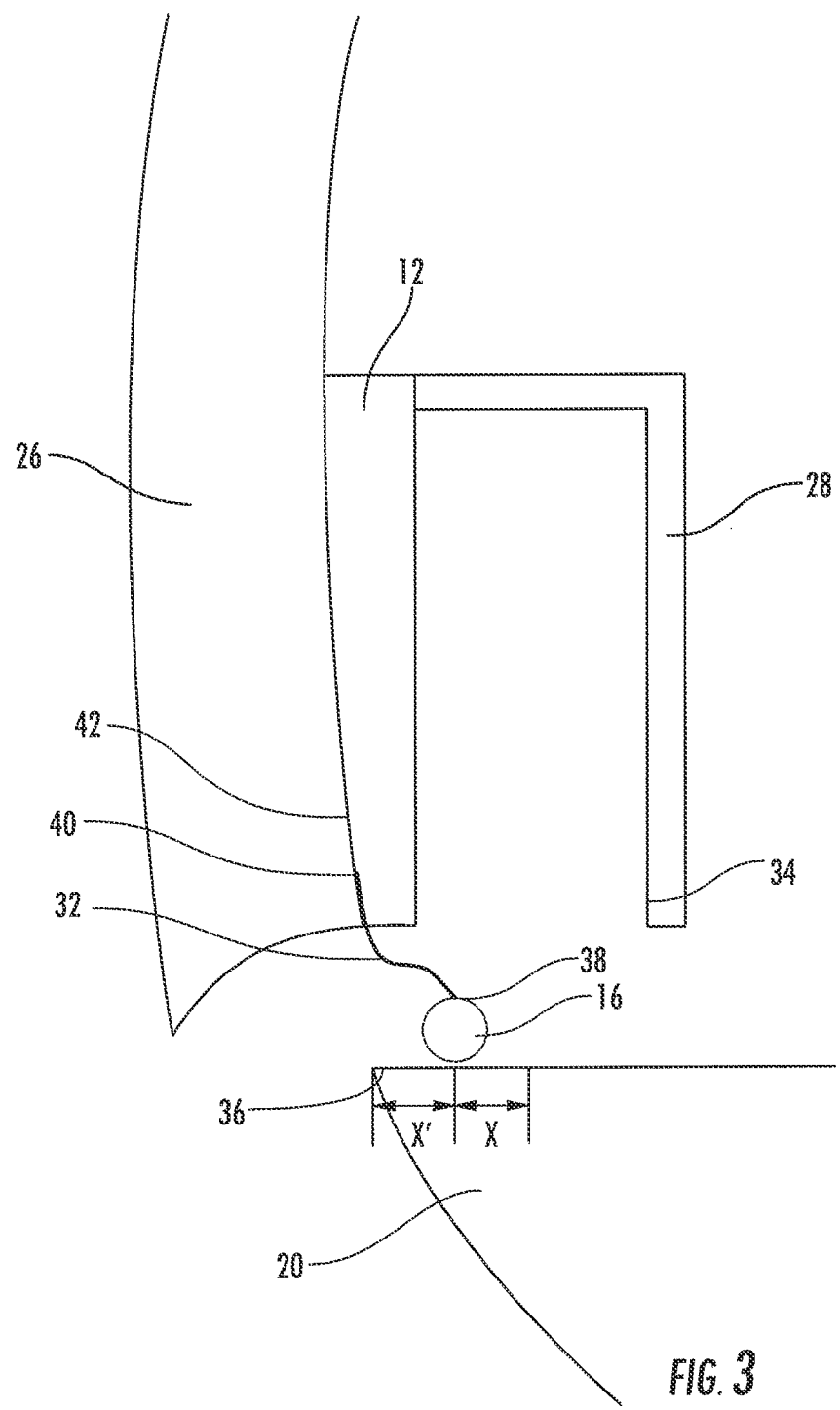
FIG. 3 schematically illustrates a side view of the slide pack of FIG. 1 with the aircraft door opening in an armed state and positioned at the point that tension is beginning to be applied to the restraint.

In the embodiments where the outboard surface 42 is positioned inwardly of the girt bar 16, the aircraft door 26 must travel outwardly a distance that is approximately twice the distance X before the restraint 32 is placed under tension by the movement of the aircraft door 26. In other words, as shown in FIG. 3, the outboard surface 42 must be outwardly spaced apart from the girt bar 16 by a distance X', where X' is approximately the same magnitude as distance X. Therefore, in the embodiments where the distance X is approximately 2.25, the total distance traveled by the aircraft door 26 is approximately 4.5 inches before the restraint 32 is placed under tension.

In the embodiments where the girt bar 16 is positioned inwardly relative to the outboard surface 42 of the packboard 12, the restraint 32 may be placed under tension approximately as soon as the aircraft door 26 begins to move outwardly or very shortly thereafter, depending on the amount of slack that is provided in the restraint 32 between the girt bar 16 and the outboard surface 42 when the aircraft door 26 is closed.

Figure 4:
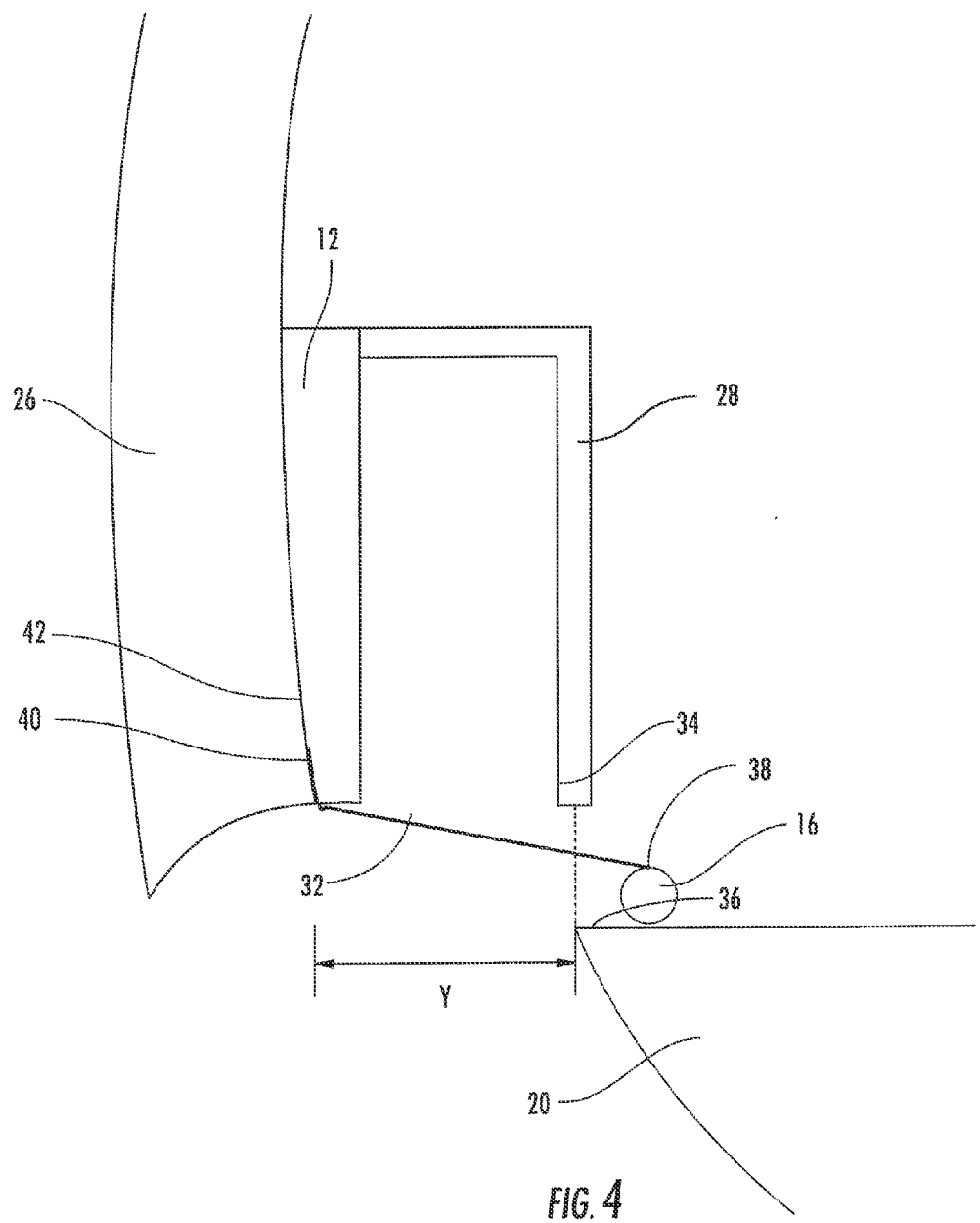
FIG. 4 schematically illustrates a side view of the slide pack of FIG. 1 with the aircraft door opening in an armed state and positioned with the inside edge of the door bustle clearing a vertical sill of the aircraft.
Figure 5:
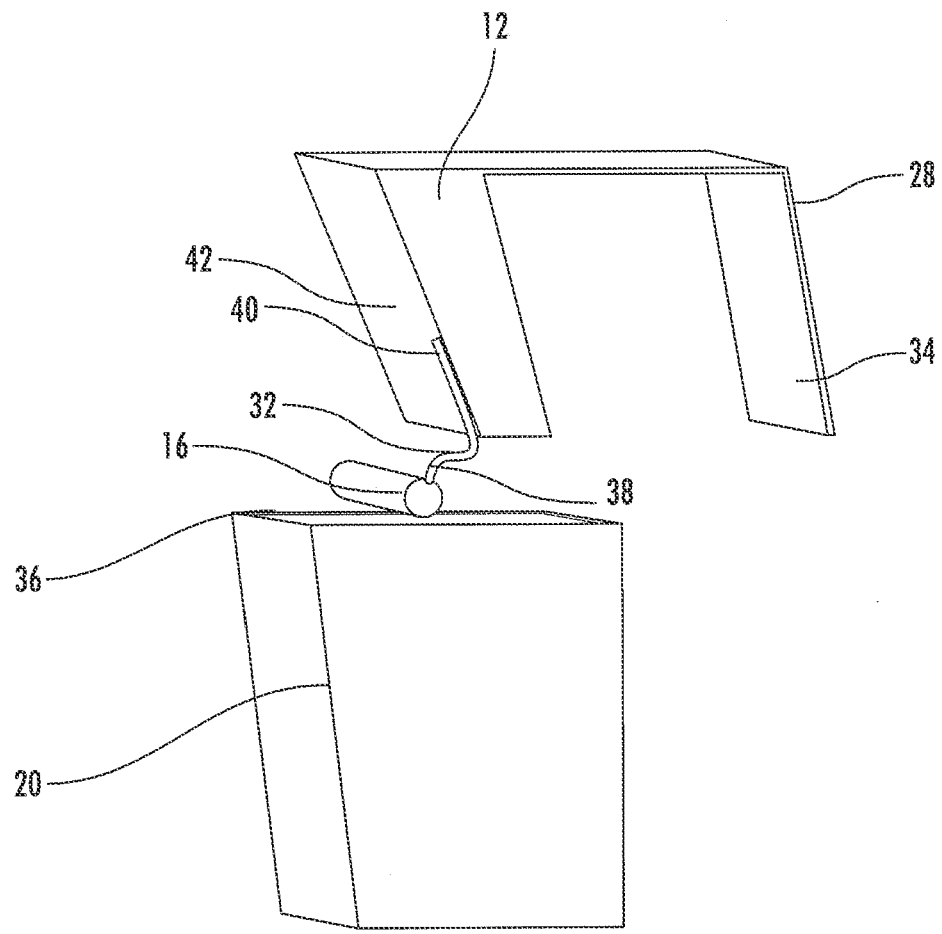
FIG. 5 schematically illustrates a perspective view of the slide pack of FIG. 1 with the aircraft door closed and armed.

Once the restraint 32 is placed under tension by the outward movement of the aircraft door 26, the restraint 32 comprises an energy absorbing portion 44 that begins to exert a resistive force on the aircraft door 26, thus slowing down the movement of the aircraft door 26 by dissipating the aircraft door's 26 energy. The restraint 32 slows the movement of the aircraft door 26 by an amount that provides sufficient time for the release cable 18 to be pulled, which releases the evacuation slide 24. The restraint 32 is further designed so that the restraint 32 breaks away or detaches when the inside edge 34 of the door bustle 28 reaches the door sill 36. As illustrated in FIG. 4, the total distance between the point where the restraint 32 is placed under tension and the inside edge 34 of the door bustle 28 reaching the door sill 36 is represented by a predetermined distance Y. In certain embodiments, the predetermined distance Y is approximately 7 inches. However, a person of ordinary skill in the art will understand and appreciate that the predetermined distance may be any suitable distance, and may depend on the relative location of the girt bar 16, the location of the outboard surface 42 when the aircraft door 26 is closed, and the distance between the girt bar 16 and the door sill 36.

The energy absorbing portion 44 of the restraint 32 may be configured with a frangible design. In these embodiments, the energy absorbing portion 44 is designed to break when a sufficiently high strain is placed on the restraint 32, and could have the effect of almost stalling the aircraft door 26 before breaking. Thus, in these embodiments, the energy absorbing portion 44 may create a sufficiently large shock load on the aircraft door 26 that may damage its opening mechanism, which could in turn prevent the evacuation slide 24 from deploying.

Figure 6:
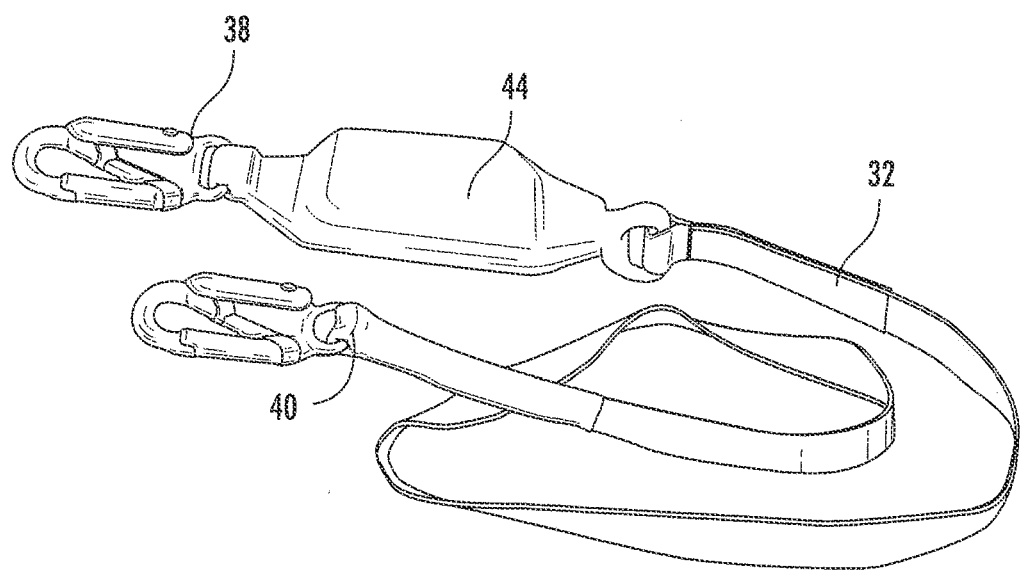
FIG. 6 schematically illustrates an exemplary embodiment of a restraint used with the slide pack of FIG. 1.

In other embodiments, the energy absorbing portion 44 of the restraint 32 may dissipate energy slowly over a brief period of time, which may provide a smaller (or minimal) shock load on the aircraft door 26. An exemplary embodiment of such a restraint 32 is shown in FIG. 6. In these embodiments, the restraint 32 is formed of webbing that is sewn with loops (similar to carpet) with no back stitch and includes a shock absorber with a woven inner core that smoothly expands to dissipate energy. In certain embodiments, the restraint 32 may be able to dissipate the load over the entire predetermined distance Y. In other embodiments, the restraint 32 dissipates the load over approximately one-half the predetermined distance Y. In certain embodiments, the restraint 32 is configured to have lengths of webbing sewn together to dissipate the energy by breaking the stitching or may comprise a high strength hook-and-loop design (i.e., Velcro). The restraint 32 may be positioned between the outboard surface 42 and the girt bar 16 in a location that does not interfere with the deployment of the evacuation slide 24, which may be particularly important for embodiments where the restraint 32 dissipates the energy but remains connected to the outboard surface 42 and the girt bar 16.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An inflatable evacuation slide system for an aircraft comprising:
   (a) a slide pack comprising a packboard coupled to an aircraft door and a release assembly;
   (b) a girt bar coupled to a fixed end of the slide pack, wherein the girt bar is configured to couple to an aircraft floor when the aircraft door is armed;
   (c) the release assembly of the slide pack coupled to a pack release cable attached to the girt bar; and
   (d) a restraint coupled to the packboard and the girt bar, wherein the restraint is formed of webbing sewn with loops and no back stitch;
   wherein the restraint is configured to be placed under tension between the packboard and the girt bar by an outward movement of the aircraft door when the aircraft door is armed;
   wherein the loops in the webbing of the restraint are broken by the outward movement of the aircraft door.

2. The inflatable evacuation slide system of claim 1, further comprising a door bustle coupled to the packboard, wherein the restraint is configured to break when an inside edge of the door bustle vertically clears a door sill of the aircraft.

3. The inflatable evacuation slide system of claim 1, wherein a total distance of the outward movement of the aircraft door is approximately 7 inches.

4. The inflatable evacuation slide system of claim 1, wherein the restraint is formed of high strength hook-and-loop materials.

5. The inflatable evacuation slide system of claim 1, wherein the loops in the webbing of the restraint are broken when a total distance of the outward movement of the aircraft door exceeds 7 inches.

6. An inflatable evacuation slide system for an aircraft comprising:
(a) a slide pack comprising a packboard coupled to an aircraft door and a release assembly;
(b) a girt bar coupled to a fixed end of the slide pack, wherein the girt bar is configured to couple to an aircraft floor when the aircraft door is armed;
(c) the release assembly of the slide pack coupled to a pack release cable attached to the girt bar; and
(d) a restraint coupled to the packboard and the girt bar, wherein the restraint comprises an energy absorbing portion;
wherein the restraint is configured to slow an outward movement of the aircraft door when the aircraft door is armed until the pack release cable is pulled;
wherein the energy absorbing portion of the restraint is broken by the outward movement of the aircraft door.

7. The inflatable evacuation slide system of claim 6, further comprising a door bustle coupled to the packboard, wherein the restraint is configured to break when an inside edge of the door bustle vertically clears a door sill of the aircraft.

8. The inflatable evacuation slide system of claim 6, wherein a total distance of the outward movement of the aircraft door is approximately 7 inches.

9. The inflatable evacuation slide system of claim 6, wherein the restraint is formed of webbing sewn with loops and no back stitch.

10. The inflatable evacuation slide system of claim 9, wherein the loops in the webbing of the restraint are broken by the outward movement of the aircraft door.

11. The inflatable evacuation slide system of claim 6, wherein the restraint is formed of high strength hook-and-loop materials.

12. The inflatable evacuation slide system of claim 6, wherein the energy absorbing portion is broken when a total distance of the outward movement of the aircraft door exceeds 7 inches.

13. An inflatable evacuation slide system for an aircraft comprising:
(a) a slide pack comprising a packboard coupled to an aircraft door and a release assembly;
(b) a girt bar coupled to a fixed end of the slide pack, wherein the girt bar is configured to couple to an aircraft floor when the aircraft door is armed;
(c) the release assembly of the slide pack coupled to a pack release cable attached to the girt bar; and
(d) a restraint coupled to the packboard and the girt bar, wherein the restraint is formed of webbing sewn with loops and no back stitch;
wherein the restraint is configured to slow an outward movement of the aircraft door when the aircraft door is armed and once the restraint is placed under tension;
wherein the loops in the webbing of the restraint are broken by the outward movement of the aircraft door.

14. The inflatable evacuation slide system of claim 13, further comprising a door bustle coupled to the packboard, wherein the restraint is configured to break when an inside edge of the door bustle vertically clears a door sill of the aircraft.

15. The inflatable evacuation slide system of claim 13, wherein a total distance of the outward movement of the aircraft door is approximately 7 inches.

\* \* \* \* \*